(12) United States Patent
Martins

(10) Patent No.: US 12,735,192 B2
(45) Date of Patent: Sep. 15, 2026

(54) TANK WALL LINER, TANK AND AIRCRAFT EMPLOYING SAID TANK WALL LINER AND ASSOCIATED MANUFACTURING METHODS

(71) Applicant: Airbus Operations GmbH, Hamburg (DE)

(72) Inventor: Jose Martins, Hamburg (DE)

(73) Assignee: Airbus Operations GmbH, Hamburg (DE)

( * ) Notice: Subject to any disclaimer, the term of this patent is extended or adjusted under 35 U.S.C. 154(b) by 537 days.

(21) Appl. No.: 18/167,980

(22) Filed: Feb. 13, 2023

(65) Prior Publication Data

US 2023/0271716 A1 Aug. 31, 2023

(30) Foreign Application Priority Data

Feb. 25, 2022 (EP) .................................... 22158932

(51) Int. Cl.
*B64D 37/06* (2006.01)
*B64C 1/06* (2006.01)

(52) U.S. Cl.
CPC .............. *B64D 37/06* (2013.01); *B64C 1/068* (2013.01)

(58) Field of Classification Search
CPC ........ B64D 37/06; B64C 1/068; B65D 88/22; B65D 88/24; B65D 90/04; B65D 90/046; B65D 90/047; H01M 8/0276
See application file for complete search history.

(56) References Cited

U.S. PATENT DOCUMENTS

| | | | | | |
|---|---|---|---|---|---|
| 2,102,590 | A | * | 12/1937 | Gray ...................... | B64D 37/06 206/521 |
| 2,397,184 | A | | 3/1946 | Julius | |
| 2,629,680 | A | | 2/1953 | Henry | |
| 2,726,056 | A | | 12/1955 | Tatom et al. | |
| 3,645,816 | A | * | 2/1972 | Billias ................. | B64D 37/005 29/402.09 |
| 5,976,997 | A | * | 11/1999 | Meaney ................. | B32B 15/06 442/232 |
| 6,145,690 | A | * | 11/2000 | Dhellemmes ........... | F17C 3/025 220/560.07 |
| 6,176,452 | B1 | | 1/2001 | Gallegos | |
| 2006/0078705 | A1 | | 4/2006 | Glatkowski et al. | |
| 2009/0114427 | A1 | | 5/2009 | Feider et al. | |
| 2022/0234316 | A1 | | 7/2022 | Weber et al. | |

FOREIGN PATENT DOCUMENTS

DE 102021101981 A1 7/2022

OTHER PUBLICATIONS

European Search Report for European Patent Application No. 22158932.8 dated Jul. 25, 2022; priority document.

* cited by examiner

*Primary Examiner* — Andrew T Kirsch
(74) *Attorney, Agent, or Firm* — Greer, Burns & Crain, Ltd.

(57) ABSTRACT

A tank wall liner for a fuel tank includes a liner body made of a liner material. The liner material is a sealant or composite of sealant and fiber and/or textile materials. Multiple tank wall liners are installed on a tank wall and form a lining surface that seals the fuel in the tank from the tank skin. Also, a tank with the tank wall liner, an aircraft with a tank forming a portion of the fuselage, and methods of manufacturing the tank wall liner and the tank.

14 Claims, 4 Drawing Sheets

TANK WALL LINER, TANK AND AIRCRAFT EMPLOYING SAID TANK WALL LINER AND ASSOCIATED MANUFACTURING METHODS

CROSS-REFERENCES TO RELATED APPLICATIONS

This application claims the benefit of the European patent application No. 22158932.8 filed on Feb. 25, 2022, the entire disclosure of which is incorporated herein by way of reference.

FIELD OF THE INVENTION

The invention relates to a tank wall liner for a tank, preferably of an aircraft. The invention further relates to a tank lined with such a tank wall liner and an aircraft. Still further the invention relates to manufacturing methods for the tank and the tank wall liner.

BACKGROUND OF THE INVENTION

Different kinds of liners or patches are known from US 2006/0 078 705 A1 and US 2009/0 114 427 A1. Another patch is known from unpublished German patent application 10 2021 101 981.8 which relates to a smart repair patch.

Due to increasing consciousness for the environmental impact of air travel, the requirements for fuel safety as it relates to environmental damage also increases. Thus there exists a need for improved fuel tanks that are able to mitigate the risk of fuel leakage even in case of mechanical damage to the tank. In other words, the fuel tank's failsafe capabilities shall be improved.

SUMMARY OF THE INVENTION

It is an object of the invention to provide measures that improve the failsafe capabilities of fuel tanks, preferably for aircraft.

The invention provides a tank wall liner for a tank, preferably of an aircraft, the tank having a tank wall that encloses a tank volume, wherein the tank wall liner comprises a liner body made of a liner material, the liner body comprising a mounting surface configured to be installed facing a tank wall and at least one sealing surface configured to be installed facing another tank wall liner, wherein the liner material includes a cured sealant that is suitable for jet fuel.

Preferably, the liner material includes at least one reinforcement layer made of a textile or fiber material.

Preferably, the reinforcement layer is arranged entirely within the cured sealant or wherein the reinforcement layer protrudes from at least one sealing surface.

Preferably, the reinforcement layer is arranged in a thickness direction of the liner body in any or one of the following portions: in the lower third, the medium third, or the upper third of the liner body.

Preferably, the liner body comprises a plurality of cut-outs or through-holes that are suitable for accommodating fasteners of the tank.

Preferably, the cut-outs or through-holes are only into or through the cured sealant or both the cured sealant and the reinforcement layer.

The invention provides a tank, preferably for an aircraft, the tank comprising a tank wall that encloses a tank volume for fuel, preferably jet fuel, wherein a plurality of preferred tank wall liners is mounted to the tank wall on the inside of the tank volume so as to form a lined tank wall portion that is configured to seal the tank wall from the jet fuel.

Preferably, the tank wall forms a fuselage section, preferably an aft fuselage section, of a fuselage of an aircraft.

Preferably, the tank wall liners are adhesively bonded to the tank wall, preferably with a sealant.

Preferably, the tank wall comprises a frame structure and a skin that is supported by the frame structure, wherein the tank wall liners are mounted between parts of the frame structure and to the skin.

Preferably, the frame structure comprises a plurality of ribs and stringers, wherein a pair of ribs and stringers form a contoured area, and the tank wall liner is shaped to match the contoured area.

Preferably, laterally adjacent tank wall liners form a joint that is sealed with sealant.

The invention provides an aircraft comprising a preferred tank.

The invention provides a method for manufacturing a tank for an aircraft, the method comprising:

- preparing a tank volume by forming a tank wall;
- applying a self curing sealant to a portion of the tank wall on the inside of the tank volume; and
- arranging a plurality of tank wall liners on the sealant covered portion so as to form a lined tank wall portion that is configured to seal the tank wall from the jet fuel.

The invention provides a method for manufacturing a tank wall liner, the method comprising:

a) preparing a layer of sealant;

b) curing or letting cure the sealant.

Preferably, the method comprises a step c) of laying a layer of fiber or textile material on the sealant layer cured in step b).

Preferably, the method comprises a step d) of applying another layer of sealant on the fiber or textile layer and performing step b) on that layer.

Preferably, the steps b) to d) are repeated until a predetermined number of fiber or textile layers are embedded between sealant layers.

The tank wall liners allow for enhanced protection against fuel leakages. The tank wall liners (also called sealing patches) can be made of a sealant that is generally used in aviation. Typical examples are polysulfide or polythioether based sealants. In another embodiment the patches may also be made from fluoroelastomeric materials. The patches may be reinforced using textiles or fibers, e.g. glass fibers, polyester fibers or aramid fibers. The tank wall liners can be separately manufactured and subsequently installed on the inside of a corresponding tank. This also allows retrofitting of tanks that are already in service. The tank wall liners are preferably bonded to the tank wall with a self-curing sealant, that may be of the same type or the same sealant that forms the patches. The tank wall liners are preferably made in rectangular (including square), circular or ellipsoidal shapes and can be cut during installation to fit the specific location in the tank.

The tank wall liners preferably have a thickness of 0.5 mm to 12 mm, more preferably a thickness of 1 mm to 4 mm. The liner may have a length of 200 mm to 700 mm, more preferably a length of 400 mm to 600 mm. The liner may have a width of 50 mm to 500 mm, preferably of 100 mm to 300 mm.

The tank wall liners may be formed as plates or plate-like elements. The tank wall liners can also have one or more legs, when viewed in a cross-section. The legs may protrude perpendicularly from the main part to preferably form a U-shape. The main part and/or the one or more legs may include or exclude a reinforcement layer, as desired by the application.

BRIEF DESCRIPTION OF THE DRAWINGS

Embodiments of the invention are described in more detail with reference to the accompanying schematic drawings that are listed below

DETAILED DESCRIPTION OF THE PREFERRED EMBODIMENTS

Figure 1:
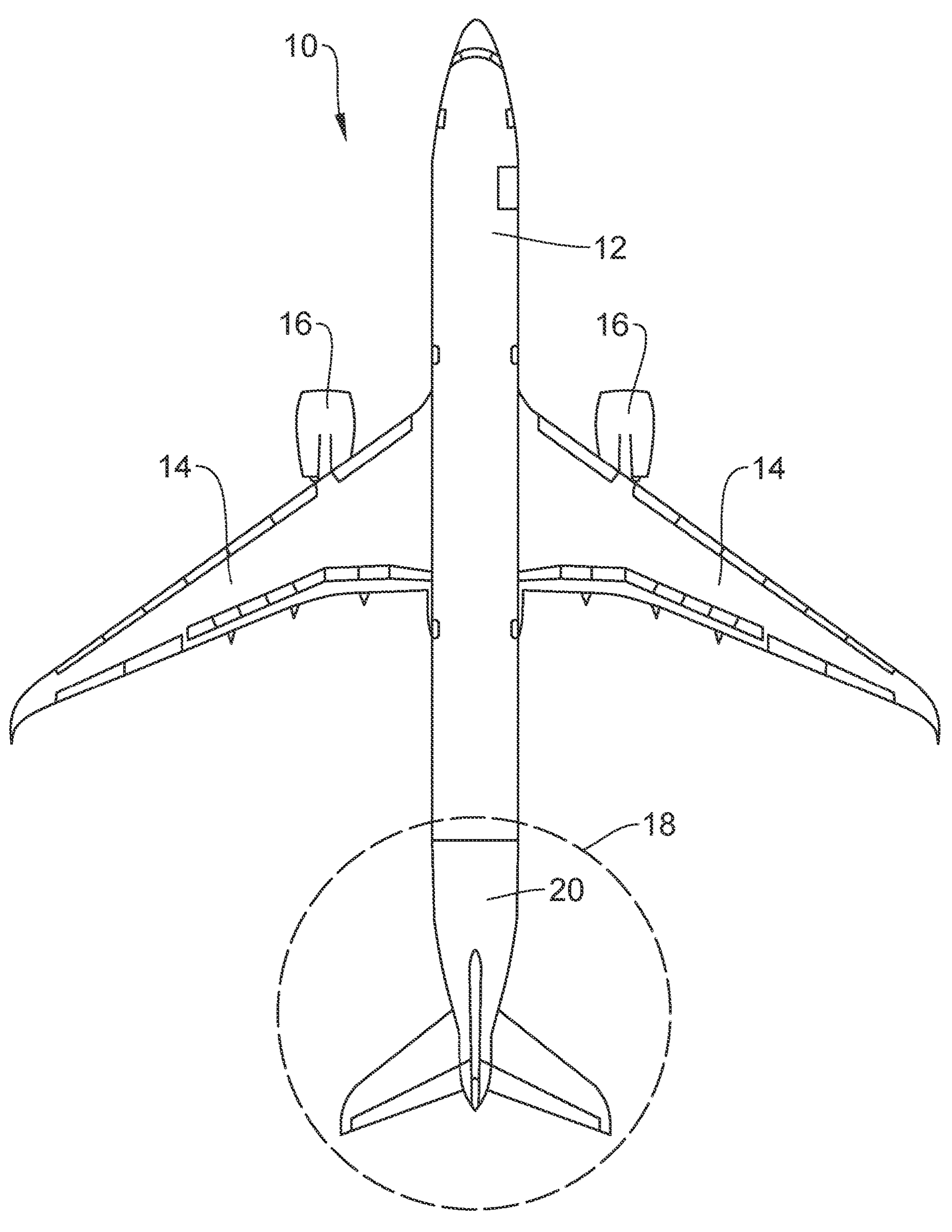
FIG. 1 depicts an embodiment of an aircraft.

Referring to FIG. 1, an aircraft 10 has a fuselage 12 and a pair of wings 14 attached to the fuselage 12. The aircraft 10 also includes a plurality of engines 16 that are attached to the wings 14. The fuselage 12 has an aft section 18 that includes horizontal and vertical tail planes and an additional fuel tank 20. The additional fuel tank 20 includes jet fuel for the engines 16 and therefore allows a range extension compared to conventional airplanes.

Figure 2:
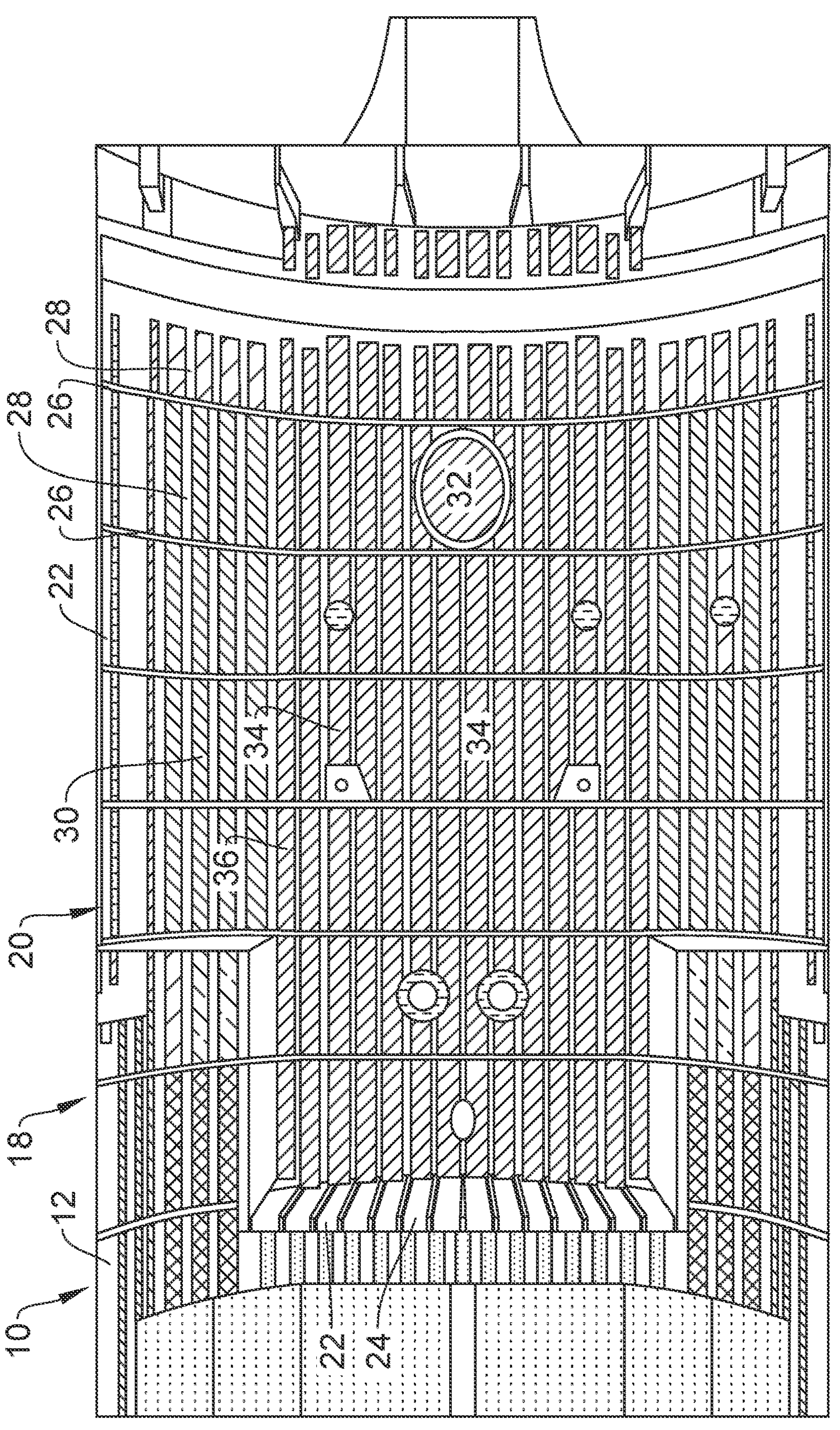
FIG. 2 depicts a top view of an inside of a tank volume with tank wall lining.

FIG. 2 depicts the fuel tank 20 in more detail. In general, the fuel tank 20 is configured in the usual manner. The fuel tank 20 includes a tank wall 22. The tank wall 22 encloses and thereby defines a tank volume for the jet fuel.

The tank wall 22 is on the one hand formed by a part of the fuselage 12 and additional wall portions 24. The tank wall 22 comprises a plurality of ribs 26 and stringers 28 which support a skin 30. The skin 30 may be made of light weight metal or fiber reinforced composite materials.

The ribs 26 and stringers 28 define mostly rectangular zones in which the skin 30 is accessible from the inside of the fuel tank 20. In addition, a man-hole portion 32 may be formed in the tank wall 22 to allow access for maintenance.

As depicted in FIG. 2, a plurality of tank wall liners 34 are arranged so as to cover the skin 30. The tank wall liners 34 may also be arranged so as to cover the ribs 26 and/or stringers 28 (not depicted). The tank wall liners 34 are preferably arranged on a bottom portion 36 of the tank wall 22. The bottom portion 36 roughly includes those sections of the tank wall 22 that face the ground and may be impacted by debris from or contact the runway during take-off. It should be noted that the tank wall liners 34 may also cover up to the entire inner surface of the tank wall 22.

FIG. 3 through FIG. 8 depict different embodiments of the tank wall liner 34 in more detail from the top (left) and in a cross-section (right).

Figure 3:
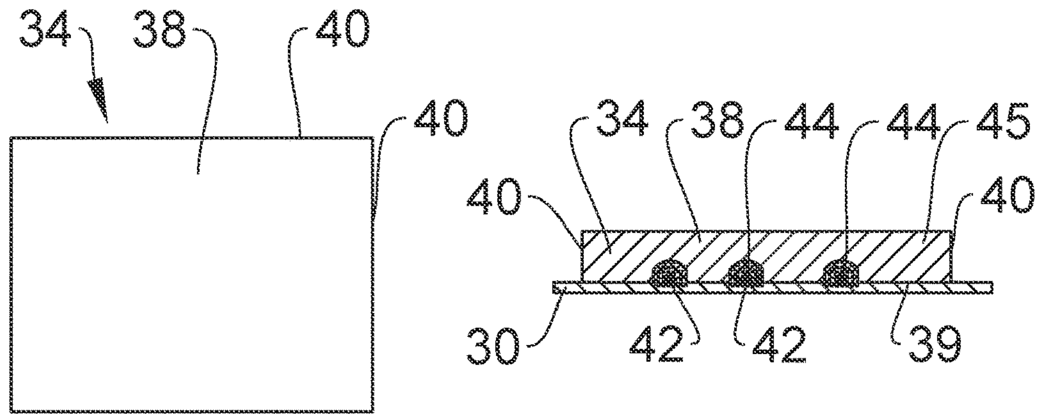
FIG. 3 depicts a top and side cross-section view of an example of a tank wall liner according to the present invention.

In FIG. 3, the tank wall liner 34 comprises a liner body 38. The liner body 38 has a roughly rectangular shape, that is preferably fitted to the grid defined by the ribs 26 and stringers 28. The liner body 38 may also have a different shape, for example a shape that fits the man-hole portion 32 or other portions. The liner body 38 is roughly plate-like and has a thickness of a couple of mm.

The liner body 38 includes a mounting surface 39. The mounting surface 39 is arranged so that it can face the tank wall 22 and be bonded thereto. In addition, the liner body 38 includes a plurality of sealing surfaces 40.

The sealing surfaces 40 are arranged such that in an installed position they can face another sealing surface of another tank wall liner 34. The sealing surfaces 40 are arranged on a circumferential portion of the tank wall liner 34.

The liner body 38 may have a plurality of cut-outs 42 that can accommodate fasteners 44 of the tank wall 22, i.e. of the ribs 26 and/or stringers 28.

The liner body 38 is made of a liner material that consists entirely of a cured sealant 45.

Subsequently, the further embodiments of the tank wall liner 34 are only described insofar as they differ from the previously described embodiment(s).

Figure 4:
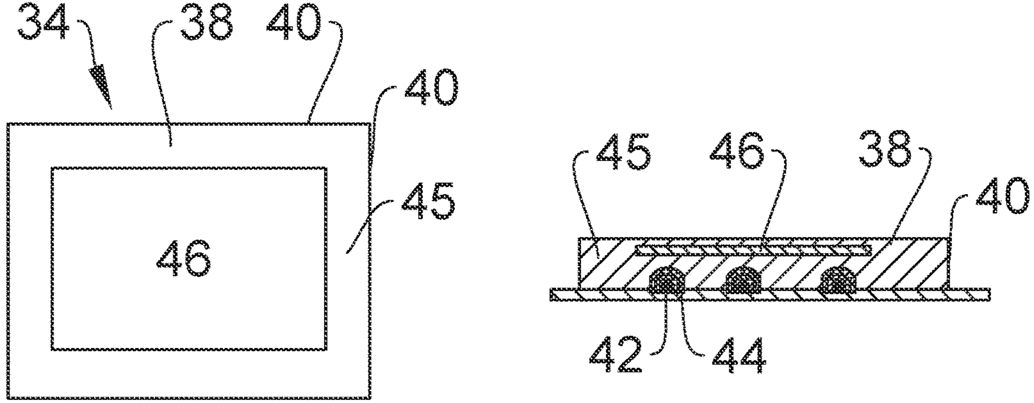
FIG. 4 depicts a top and side cross-section view of another example of a tank wall liner according to the present invention.

Referring to FIG. 4, the liner body 38 includes a reinforcement layer 46 that is made of fiber or textile material. Preferably, the reinforcement layer 46 is made of glass or aramid fibers. Thus, the liner material in this embodiment is a fiber reinforced material. As depicted in FIG. 4, the reinforcement layer 46 is entirely enclosed within the cured sealant. Preferably, the reinforcement layer is arranged in the upper third of the liner body 38 along the thickness direction. The distance from the sealing surface 40 to the reinforcement layer 46 is about 10 mm to 30 mm.

Figure 5:
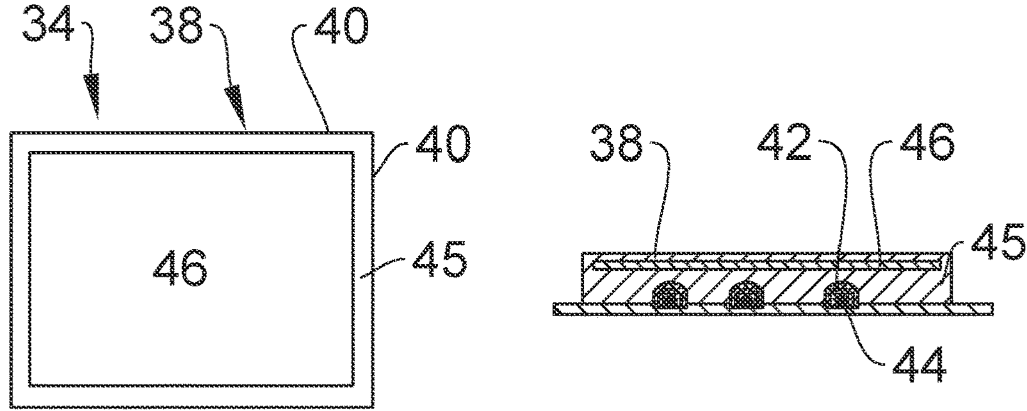
FIG. 5 depicts a top and side cross-section view of a further example of a tank wall liner according to the present invention.

Referring to FIG. 5, the liner body 38 is almost identical to the embodiment of FIG. 4. However, here the distance from the sealing surface 40 to the reinforcement layer 46 is about 3 mm to 8 mm.

Figure 6:
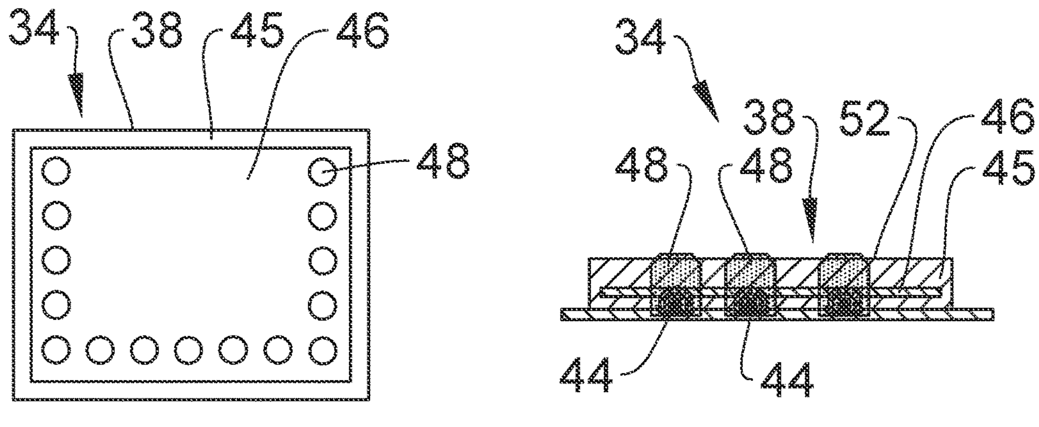
FIG. 6 depicts a top and side cross-section view of yet another example of a tank wall liner according to the present invention.

Referring to FIG. 6, the liner body 38 is similar to the embodiment of FIG. 5, but it could also be configured like the embodiments of FIG. 3 or FIG. 4. This embodiment includes a plurality of through-holes 48 that are arranged such that they go through the sealant and the reinforcement layer 46.

Figure 7:
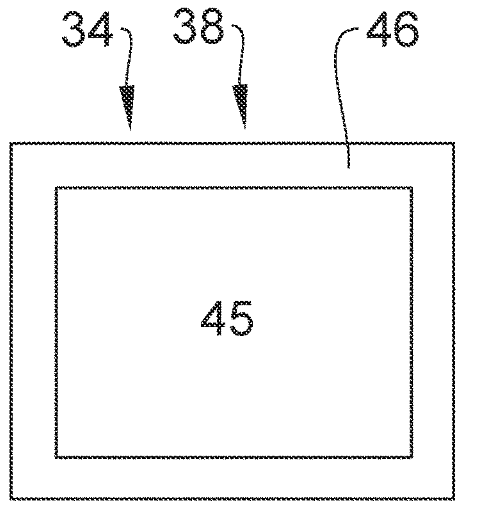
FIG. 7 depicts a top and side cross-section view of still another example of a tank wall liner according to the present invention; and, FIG. 8 depicts a top and side cross-section view of still a further example of a tank wall liner according to the present invention.
Figure 7:
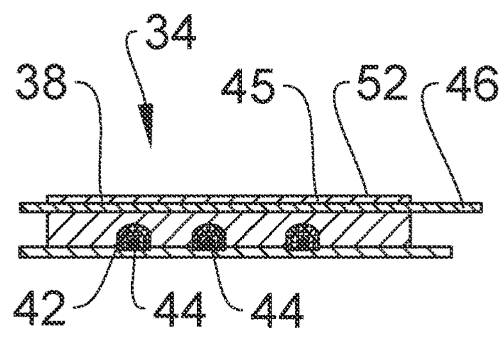

Referring to FIG. 7, the liner body 38 is again similar to the previous embodiments, with the distinction that the reinforcement layer 46 protrudes from the sealing surface 40. This embodiment may also be made with through-holes 48 similar to the previous embodiment of FIG. 6.

Figure 8:
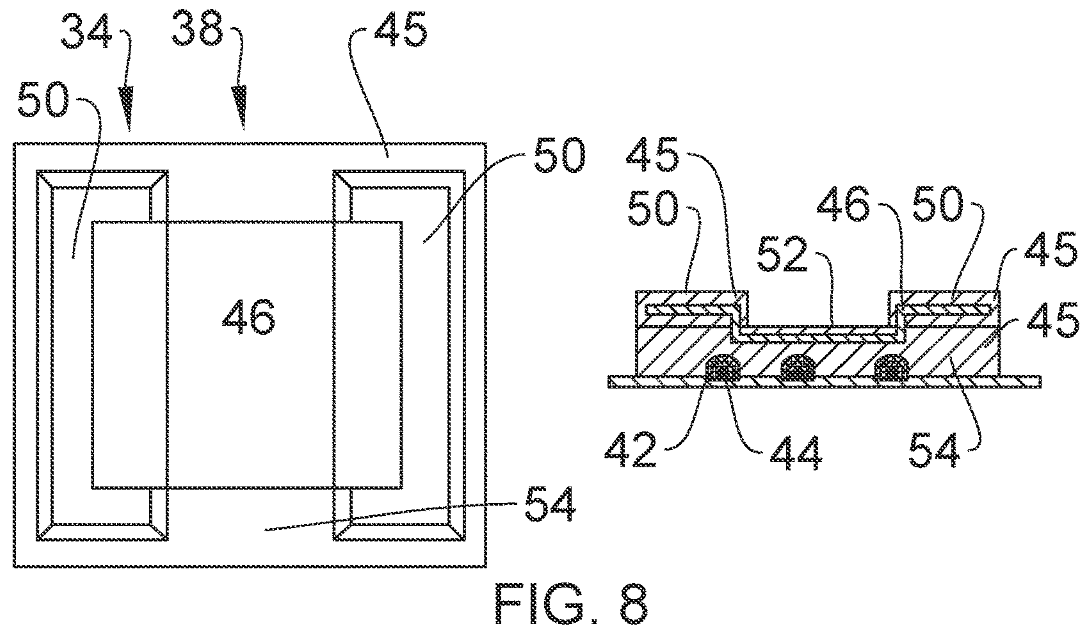

Referring to FIG. 8, the liner body 38 comprises a plurality of protrusions 50 that protrude from the inner surface 52. The inner surface 52 is opposite the mounting surface 39. When viewed in a cross-section the reinforcement layer 46 is embedded in the protrusions 50 and the main body 54.

It should be noted that in other variants that are not explicitly depicted, the reinforcement layer 46 may be arranged in the center third or the bottom third of the main body 54. Alternatively or additionally, there could be more than one reinforcement layer.

Subsequently, installation of the tank wall liners 34 is described in more detail. Initially, a wet, self-curing sealant is applied to the tank wall 22 or rather the portions that should be lined, e.g. the bottom portion 36. Then a tank wall liner 34 is arranged on the sealant, pressed on and left to cure. This process is repeated until the entire desired portion, such as the bottom portion 36, is covered with the tank wall liners 34 and forms a lining surface without gaps for the jet fuel. Depending on the configuration of the tank wall liner 34, the ribs 26 and/or stringers 28 may also be covered with sealant. It is also possible to form the protruding reinforcement layer 46 (FIG. 7) around different structures within the tank volume and fix them with sealant.

The tank wall liners 34 may be manufactured in different ways. In one embodiment, a self-curing sealant is applied to a form that corresponds to the desired shape. After curing the tank wall liner 34 is ready. In another embodiment, a reinforcement layer is put on top of the cured sealant and another layer of sealant is applied. This can be repeated multiple times, until the desired configuration of the tank wall liner 34 is achieved.

In order to improve failsafe capabilities of fuel tanks (20), preferably for aircraft (10), and in particular with respect to mitigating the risk of fuel leakage even in case of mechanical damage to the tank, a tank wall liner (34) is proposed. The tank wall liner (34) comprises a liner body (38) made of a liner material. The liner material is a sealant or composite of sealant and fiber/textile materials. Multiple tank wall liners (34) are installed on the tank wall (22) and form a lining surface that seals the fuel in the tank (20) from the tank skin (30).

While at least one exemplary embodiment of the present invention(s) is disclosed herein, it should be understood that modifications, substitutions and alternatives may be apparent to one of ordinary skill in the art and can be made without departing from the scope of this disclosure. This disclosure is intended to cover any adaptations or variations of the exemplary embodiment(s). In addition, in this disclosure, the terms "comprise" or "comprising" do not exclude other elements or steps, the terms "a" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

LIST OF REFERENCE SIGNS

10 aircraft
12 fuselage
14 wing
16 engine
18 aft section
20 fuel tank
22 tank wall
24 wall portion
26 rib
28 stringer
30 skin
32 man-hole portion
34 tank wall liner
36 bottom portion
38 liner body
39 mounting surface
40 sealing surface
42 cut-out
44 fasteners
45 cured sealant
46 reinforcement layer
48 through-holes
50 protrusion
52 inner surface
54 main body

The invention claimed is:

1. A tank wall liner for a fuel tank, the fuel tank having a tank wall that encloses a tank volume, wherein the tank wall liner comprises:
- a liner body made of a liner material, the liner body comprising a mounting surface configured to be installed facing a tank wall and a first sealing surface and a second sealing surface, each configured to be installed facing another tank wall liner,
- wherein the liner material includes a cured sealant that is compatible with jet fuel; and
- wherein the liner body is made of a preformed shape;
- wherein the tank wall liner is formed as a plate and the first sealing surface and the second sealing surface are configured to attach to another tank wall liner to form a wall;
- wherein the first sealing surface and the second sealing surface are arranged such that in an installed position the first sealing surface and the second sealing surface face another sealing surface of another tank wall liner;
- wherein the first sealing surface and the second sealing surface are arranged on a circumferential portion of the tank wall liner; and
- wherein the first sealing surface and the second sealing surface are planar.

2. The tank wall liner of claim 1, wherein the liner material includes at least one reinforcement layer made of a textile or fiber material.

3. The tank wall liner of claim 2, wherein the at least one reinforcement layer is arranged entirely within the cured sealant or wherein the at least one reinforcement layer protrudes from the first sealing surface.

4. The tank wall liner of claim 2, wherein the at least one reinforcement layer is arranged in a thickness direction of the liner body in any or one of the following portions: in a lower third, a medium third, or an upper third of the liner body.

5. The tank wall liner of claim 1, wherein the liner body comprises a plurality of cut-outs or through-holes that are suitable for accommodating fasteners of the fuel tank.

6. The tank wall liner of claim 5, wherein the cut-outs or through-holes are only into or through the cured sealant or both the cured sealant and a reinforcement layer.

7. A fuel tank comprising:
- a tank wall that encloses a tank volume for jet fuel,
- wherein a plurality of tank wall liners are mounted to the tank wall on an inside of the tank volume so as to form a lined tank wall portion that is configured to seal the tank wall from the jet fuel,
- wherein the tank wall liners from the plurality of tank wall liners each comprising a liner body made of a liner material, the liner body comprising a mounting surface configured to be installed facing a tank wall and a first sealing surface and a second sealing surface, each configured to be installed facing another tank wall liner,
- wherein the liner material includes a cured sealant that is compatible with jet fuel; and
- wherein the liner body is made of a preformed shape;
- wherein the tank wall liner is formed as a plate and the first sealing surface and the second sealing surface are configured to attach to another tank wall liner to form a wall;

wherein the first sealing surface and the second sealing surface are arranged such that in an installed position the first sealing surface and the second sealing surface face another sealing surface of another tank wall liner;

wherein the first sealing surface and the second sealing surface are arranged on a circumferential portion of the tank wall liner; and wherein the first sealing surface and the second sealing surface are planar.

8. The fuel tank of claim 7, wherein the tank wall forms a fuselage section of a fuselage of an aircraft.

9. The fuel tank of claim 7, wherein the tank wall liners from the plurality of tank wall liners are adhesively bonded to the tank wall.

10. The fuel tank of claim 7, wherein the tank wall comprises a frame structure and a skin supported by the frame structure, wherein each tank wall liner from the plurality of tank wall liners is mounted between parts of the frame structure and to the skin.

11. The fuel tank of claim 10, wherein the frame structure comprises a plurality of ribs and stringers, wherein a pair of ribs and stringers form a contoured area, and at least one tank wall liner is shaped to match the contoured area.

12. The fuel tank of claim 7, wherein laterally adjacent tank wall liners from the plurality of tank wall liners form a joint that is sealed with sealant.

13. An aircraft comprising the fuel tank according to claim 7.

14. A method for manufacturing a fuel tank for an aircraft, the method comprising:

preparing a tank volume by forming a tank wall;

applying a self-curing sealant to a portion of the tank wall on the inside of the tank volume; and arranging a plurality of preformed tank wall liners on the sealant covered portion so as to form a lined tank wall portion that is configured to seal the tank wall from a jet fuel;

wherein the tank wall liner is formed as a plate and has a first sealing surface and a second sealing surface that are configured to attach to another tank wall liner to form a wall;

wherein the first sealing surface and the second sealing surface are arranged such that in an installed position the first sealing surface and the second sealing surface face another sealing surface of another tank wall liner:

wherein the first sealing surface and the second sealing surface are arranged on a circumferential portion of the tank wall liner; and wherein the first sealing surface and the second sealing surface are planar.

* * * * *